US010293284B1

(12) United States Patent
Holindrake et al.

(10) Patent No.: US 10,293,284 B1
(45) Date of Patent: May 21, 2019

(54) IN-CHANNEL SCREENING WITH A DRUM SCREEN

(71) Applicant: Ovivo Inc., Montreal (CA)

(72) Inventors: Jared Holindrake, Salt Lake City, UT (US); Abner Aviles, American Fork, UT (US); Christopher Keever, Peachtree City, GA (US)

(73) Assignee: Ovivo Inc., Montreal (CA)

( * ) Notice: Subject to any disclaimer, the term of this patent is extended or adjusted under 35 U.S.C. 154(b) by 0 days.

(21) Appl. No.: 16/262,557

(22) Filed: Jan. 30, 2019

Related U.S. Application Data

(60) Provisional application No. 62/624,069, filed on Jan. 30, 2018.

(51) Int. Cl.
| | |
|---|---|
| *B01D 33/067* | (2006.01) |
| *B01D 33/46* | (2006.01) |
| *B01D 33/76* | (2006.01) |
| *B01D 33/11* | (2006.01) |
| *C02F 1/00* | (2006.01) |

(52) U.S. Cl.
CPC ......... *B01D 33/067* (2013.01); *B01D 33/463* (2013.01); *B01D 33/11* (2013.01); *B01D 33/76* (2013.01); *C02F 1/004* (2013.01)

(58) Field of Classification Search
CPC .... B01D 33/067; B01D 33/463; B01D 33/76; B01D 33/11; C02F 1/004
See application file for complete search history.

(56) References Cited

U.S. PATENT DOCUMENTS

| | | | | |
|---|---|---|---|---|
| 4,294,700 A | * | 10/1981 | Casper ................. | B01D 33/067 210/403 |
| 5,102,536 A | * | 4/1992 | Wiesemann ......... | B01D 33/048 210/158 |
| 5,407,563 A | * | 4/1995 | Blake .................. | B01D 33/067 210/155 |

* cited by examiner

*Primary Examiner* — David C Mellon
*Assistant Examiner* — Liam Royce
(74) *Attorney, Agent, or Firm* — Thomas M. Freiburger

(57) ABSTRACT

In a water treatment system, which may be a wastewater treatment plant, a single-inlet drum screen is installed with its rotation axis perpendicular to the pattern of flow in a channel. Retrofitting of an existing screening system with a different form of screen, residing in an existing concrete channel is described.

16 Claims, 5 Drawing Sheets

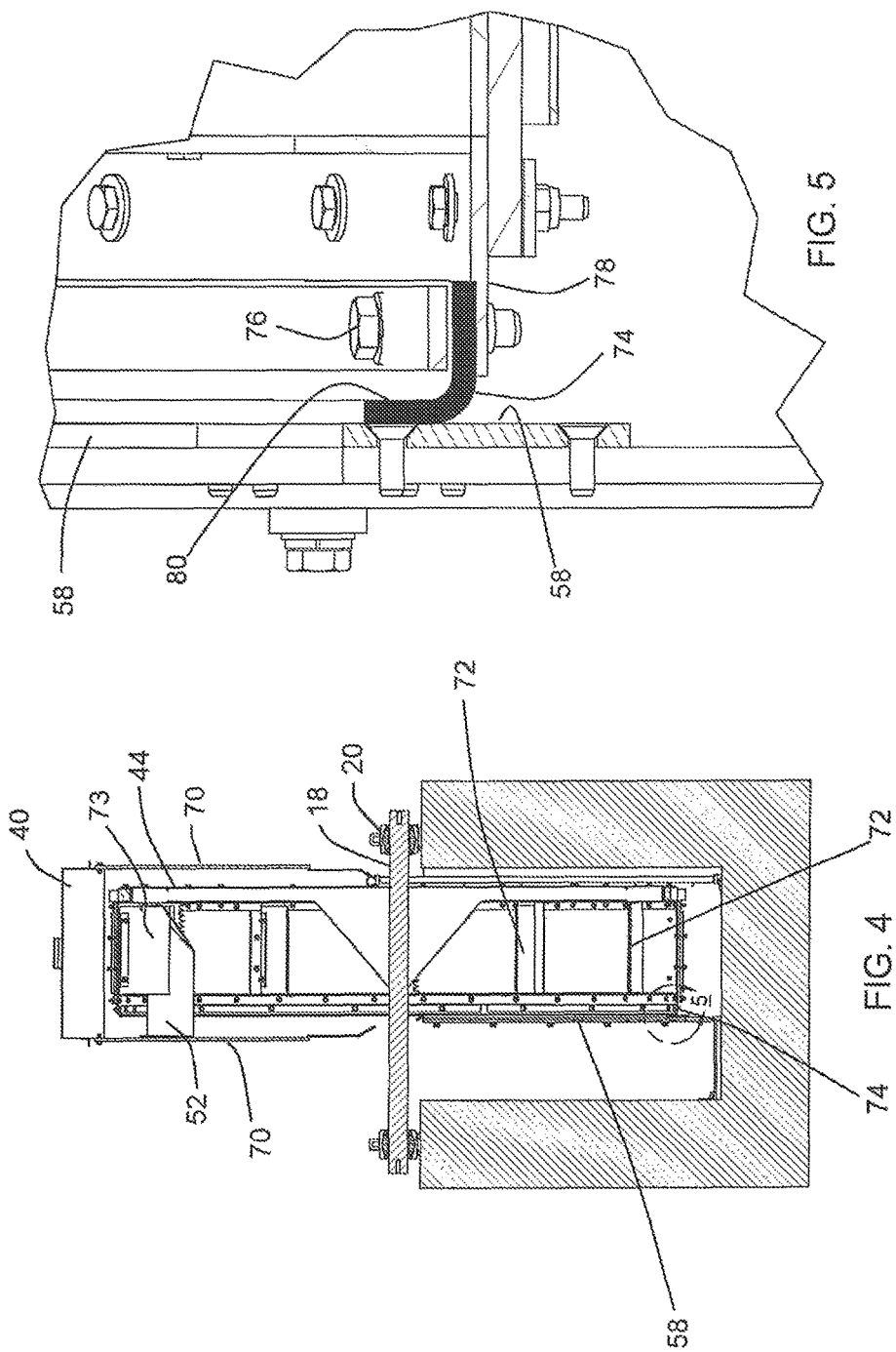

IN-CHANNEL SCREENING WITH A DRUM SCREEN

This application claims benefit of provisional application Ser. No. 62/624,069, filed Jan. 30, 2018.

BACKGROUND OF THE INVENTION

This invention concerns screening of objects from a water flow using a drum screen, and more particularly is concerned with an efficient flow pattern and arrangement of components in a drum screen system. The invention applies to wastewater treatment plants and other situations as well.

There are a number of situations in which a flow of water, especially water containing impurities, must be screened to remove relatively large particles or items prior to further steps. For example, in a wastewater treatment plant the first process applied to incoming wastewater typically involves screening. Refractory items, including plastics, and paper and other materials larger than the screen opening size are separated out since these materials typically cannot be digested. A typical range of screen size for wastewater plants is 0.5 mm to 10 mm. Screen types have included belt screens, spiral screens and drum screens, all of which include some means for removing the screened out items.

Drum screens in such applications are typically large, with diameters of 15 feet or 18 feet or even larger, such as 36 feet or greater. Large wastewater treatment plants, e.g. handling 150 million gallons per day, have employed drum screens of 36 feet diameter or greater. Many smaller plants have screened using drum screens in the range of about 14 feet to 26 feet diameter.

These typical drum screen systems the drums, which receive water from the side, have been positioned with the rotation axis parallel to the direction of flow in the channel. Thus, water enters the drum on a direct path axially into the drum, typically flowing into the lower half of the drum, flows through the screen and then continues in the same flow direction. Debris is trapped on the screen and removed out one side of the drum.

Such drum screen systems require special water flow channels, wide enough to contain the diameter of the drum. In many cases of existing plants that might advantageously be retrofitted with drum screens to replace another type of screen, the channels simply are not wide enough to accept drums of a large enough size to handle the flow. Even in a newly constructed plant or screening subsystem, considerable space is required for drum screens of adequate size, with the typical axial inflow pattern conventionally used. A more efficient drum screen system is needed.

U.S. Pat. No. 5,407,563 describes screening panel constructions for use in band screens and drum screens. FIG. 3 of that patent shows a schematic indication of a double-entry drum screen, the drum being of T-frame construction. The subject matter of the patent is the particular screen panel construction, and little description is given for FIG. 3, but the drawing has some relevance to the present invention.

SUMMARY OF THE INVENTION

The invention is a new and more efficient flow arrangement that allows a drum screen to be more easily retrofitted into existing channels and requires less space in new construction. The invention places a reduced width drum screen in an orientation such that the shaft of the drum is perpendicular to the flow of the water. The drum diameter is approximately twice the depth of the channel with the drum shaft attached at deck level. The width of the drum may be approximately half the width of the channel in which the drum is placed (or about 45% to 55% of the channel width). The water flow will travel down the channel toward the drum where a diverter plate or "S" plate will direct water around and into the drum from the side. The plate, or a channel barrier connected to the plate, may also have a simple automatic bypass gate or bypass weir to let excess flow bypass the screen in case of screen blinding. This will keep the channel from overflowing.

In smaller drum screens it is difficult to completely remove the screening from the screening panels because of the short time the panels are in the spray wash system. To overcome this, the invention employs a high pressure, multi-nozzle water spray system to remove the drum screenings into the removal trough.

Drum screens of the invention are preferably less than ten feet in diameter, and may be five feet, six feet, eight feet, etc. Such a drum screen is applicable particularly to wastewater plants of smaller capacity, e.g. under 10 million gallons per day (mgd), more preferably about 4 to 6 mgd. However, the efficient arrangement of the drum screen in the channel can also apply to larger plants with larger-diameter drum screens.

The invention enables a drum screen to be installed efficiently in a channel for new construction, and also for retrofitting an existing channel in the plant, where a screen is to be replaced. The installation requires no complex concrete geometry. The preferred small size of the drum screens allows them to be fully fabricated before shipping, rather than requiring assembly and welding in the field, which is typical of normal, much larger drum screens.

The drum screens of the invention are simple, with only two moving parts, bearings and pinion gear. A drum installation of the invention can be placed in a pumped flow system as well as other gravity flow channels. No submerged maintenance is required. The drum screen can produce a capture ratio of over 90%. The installation may include an automatic bypass or overflow gate.

The drum screen system of the invention is economical, simple in construction with few moving parts, adaptable to almost any existing channel, and can be an ideal screening solution for many applications requiring screening.

These and other objects, advantages and features of the invention will be apparent from the following description of a preferred embodiment, considered along with the accompanying drawings.

DESCRIPTION OF THE DRAWINGS

FIG. 4 is a sectional view as seen along the line 4-4 in FIG. 3.

FIG. 5 is a detail view in section, with an enlargement of the region identified as 5 in FIG. 4.

DESCRIPTION OF PREFERRED EMBODIMENTS

Figure 1:
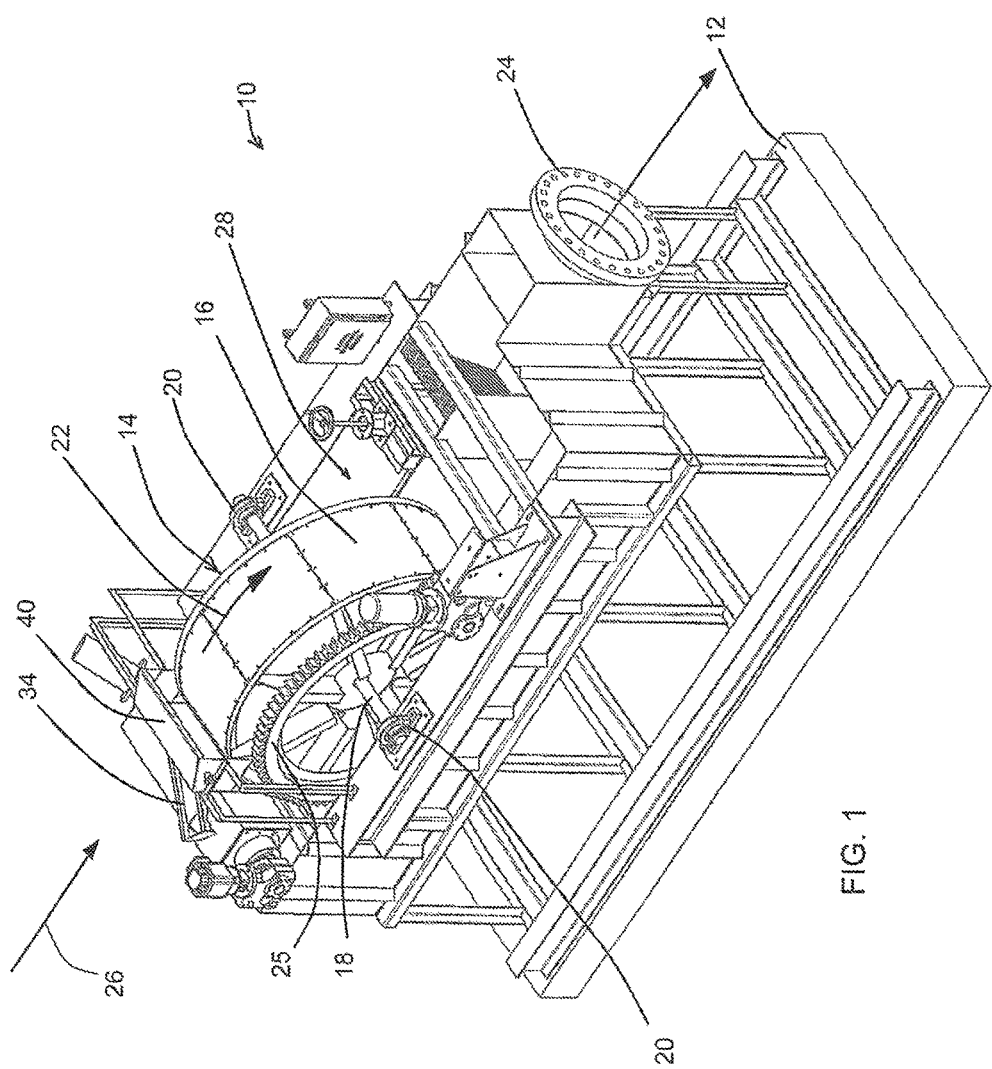
FIG. 1 is a perspective view showing one example of installation of a single entry drum screen system in accordance with the invention.

In FIG. 1 a drum screen installation of the invention is shown at 10. In this example the system is shown mounted on and elevated above a concrete floor 12, for connection to a flow of water, e.g. wastewater input to a treatment plant, from what would be the left end of the drawing in FIG. 1.

The drum screen is shown at 14, being a relatively small drum screen no greater than about ten feet in diameter. The diameter may be about six feet. Panels of the drum screen are shown at 16, and these can have opening size in the range of about 0.5 mm to 10 mm, with 0.5 mm to about 2 mm typically used in polishing steps. The drum is supported on a rotational shaft 18, which is supported on bearings 20, one at each side. The direction of revolution of the drum in this particular installation is in the clockwise direction as viewed in this drawing, i.e. as shown by the directional arrow 22. The bottom of the drum screen thus moves against the direction of general flow through the installation. In this pumped-inflow system (as opposed to a concrete channel), an outflow fitting downstream of the drum screen is shown at 24, for connection to a pipe, and with an inlet fitting at the inlet end, not seen in FIG. 1.

This is a single entry drum screen, the drum being open at the side opposite the gearing shown at 25 on the near side of the drawing. Influent flow is indicated at 26, into a channel 28 that feeds the water into the far side of the drum screen 14. Typically water level entering the drum screen is just below the rotation shaft 18. The outlet 24 could be at a different position, such as in line with the drum screen, if desired. Also the inlet flow then could be in line with the drum screen but diverted left just upstream of the drum to facilitate drum entry.

The single-entry drum screen, as is typical, has all structural drum support at the near side as viewed in FIG. 1, without spokes or other radial obstructions at the opposite side. This allows intrusion of a debris catcher or discharge hopper from the far side into the drum interior, not seen in FIG. 1. The hopper feeds the debris to a wash water trough 34 which carries the debris away. Spray equipment 40 drives debris off the drum and into the hopper.

The drum 14 is a cup drum, with a series of lifting elevators (not shown in FIG. 1) on the inner side of the screen to help move debris up toward the discharge hopper. The water and debris enter pushing generally in the direction of flow. Much of the debris is caught near the bottom, and the debris rotates in the clockwise direction as seen in FIG. 1, up to a position near the top where it is sprayed from outside the screen with pressurized wash water at 40, preferably with high-velocity nozzles, to release it into the debris hopper.

The arrangement according to the invention shown in FIGS. 1 through 5 provides a compact assembly especially since the drum screen 14 is essentially parallel to the water or wastewater flow, rotatable on an axis that is perpendicular to that flow. Prior drum screen installations have usually had the rotational axis parallel to flow, so that influent liquid travels axially into one side of the drum in a single-entry system. Typically these drums are very large, thus requiring a custom-built system of liquid channels that will accommodate that large diameter. In a system of the invention the drum screen preferably is ten feet or less in diameter, with a maximum width to diameter ratio usually about 5:8, more typically about 1:2. As seen in these drawings, the total channel width can be quite narrow, requiring a parallel flow offset to the side of the drum screen's width, with flow then directed into an open side of the single-entry drum.

FIGS. 1A through 5 show a single entry drum screen installation 42, with a drum screen 44 positioned in a channel 46, typically a concrete channel. This can be a retrofit in a channel which had been equipped with a different type of screening. The channel 46 is defined by concrete walls 48 and floor 50.

In this case the direction of rotation of the drum screen 44 is different from that of FIG. 1, with the drum screen's bottom moving in the general direction of water flow through the channel. This is preferable in a straight channel, with the debris being carried toward the outlet of the flow. The drum screen is positioned at one side of the channel, supported on a shaft 18 via bearings 20 as described above. The remaining channel width receives the full water flow.

Figure 1A:
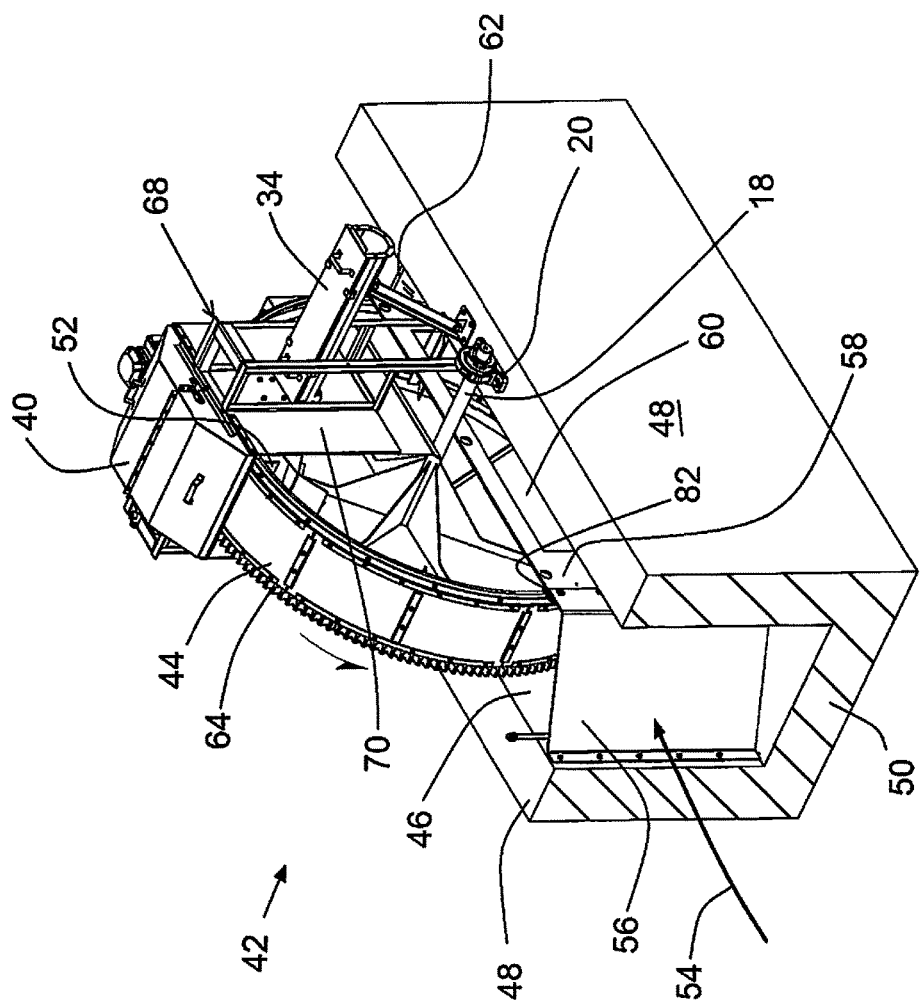
FIG. 1A is a perspective view showing another example of the single entry drum screen arrangement of the invention.
Figure 2:
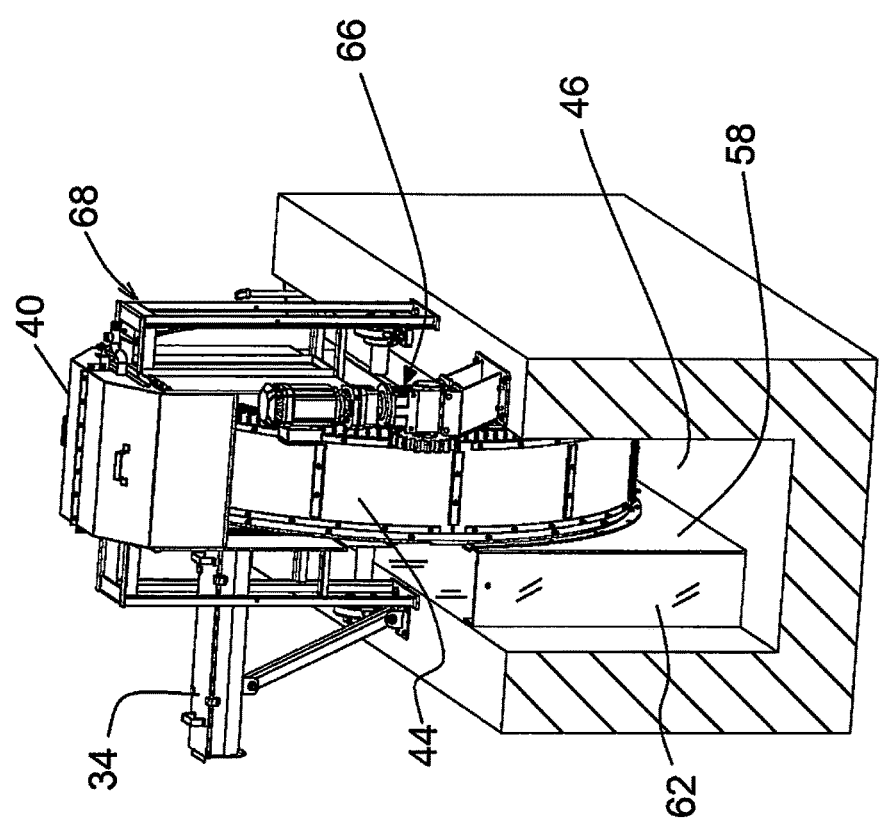
FIG. 2 is another perspective view, showing the FIG. 1A installation at its outlet end.

In FIG. 1A a debris hopper can be partially seen at 52, at or near the highest point of drum travel, and spray equipment is shown at 40, outside the drum and positioned to dislodge debris down into the hopper. A wash water trough is shown at 34, as above.

Water flowing into the inlet end of the installation, indicated by the arrow 54, is diverted to the right side of the channel by a diverter plate 56 (which can be referred to as an "S" plate due to its shape). Preferably this angled plate is connected to or integral with a seal plate 58 that seals against the side of the drum screen 44 as it rotates. The plate will also guide heavy debris into the drum from the channel floor.

A large essentially semi-circular or open U-shaped opening 60 is defined by the seal plate 58 so that the water is diverted into the open side of the drum screen. A barrier is provided at 62, connected to or sealed against the seal plate 58 at right angles, to prevent water from bypassing the drum screen. FIGS. 2 to 5 show these features from different view points. The barrier 62 can act as a safety overflow weir.

A drum drive gear is shown at 64. A motor and gearing in driving engagement with the drum gear 64 are shown at 66 in FIG. 2. Support structure is shown at 68 in FIGS. 1A, 2 and 3, to support the debris trough 52, spray equipment 40, wash water trough 34 and water deflecting side plates 70 which can be on the concrete walls 48. The side plates 70, which can be hanging sheets of Neoprene, deflect and contain water from the spray nozzles.

Figure 3:
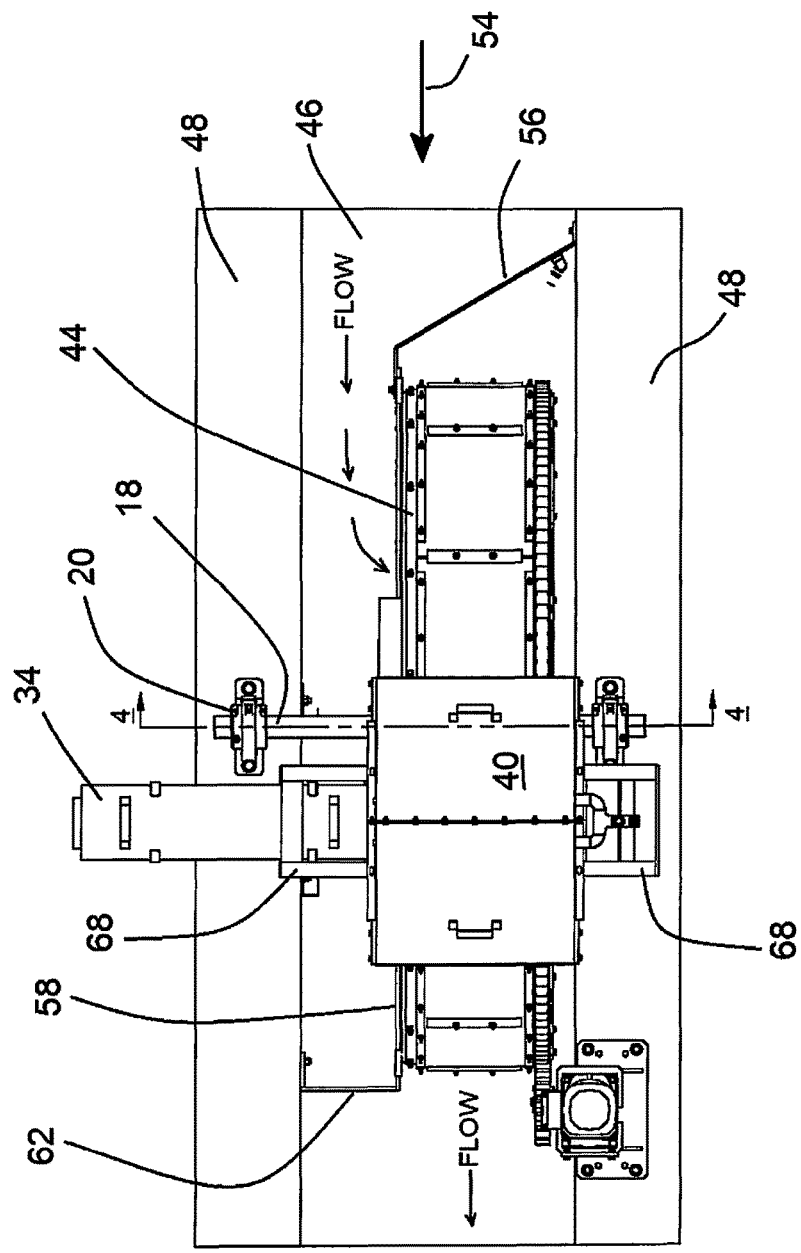
FIG. 3 is a plan view of the same installation.

In the plan view of FIG. 3, the flow of water through the installation is clearly depicted. The water enters in alignment with the channel, as shown at the arrow 54, and is shifted to the right side of the channel 46 by the flow diverter plate 56. The water enters the side of the drum screen 44, thus being shifted back to the left side of the channel 46. The barrier 62 closes the right side of the channel at or near the downstream end of the drum screen as shown, being connected to the drum seal plate 58. At the outlet end of the installation, the flow exiting the drum screen again fills the width of the channel 46 as indicated.

FIGS. 4 and 5 show further details of the invention. The sectional view of FIG. 4 is taken through the rotation shaft 18, looking toward the inlet end of the system. The debris hopper 52 is visible in FIG. 4, extending into the interior of the cup drum screen 44. The water deflecting side plates 70 are provided on each side, with the side plate on the left in FIG. 4 open for movement of collected debris exiting from the hopper 52. Lift plates or elevators 72 are indicated on the interior of the drum screen, secured at spaced positions along the screen for moving debris up the drum to be collected in the hopper. Shown at the top of the drum screen in the position of FIG. 4 is a flexible, preferably Neoprene wiper 73 that engages the hopper 52 once per revolution. The wiper 73 contacts the top edge of the hopper, deflects and wipes debris such as fabric items off the hopper lip.

The spray equipment is shown at 40, above the hopper 52, with high pressure, high velocity nozzles to reliably dislodge debris off the screen and into the hopper. The high velocity, multi-nozzle spray can compensate for the relatively small diameter of the drum, which would otherwise make debris removal difficult. In a preferred embodiment the nozzle pressure is about 45 to 90 psi, more preferably about 60 psi.

The sealing around the drum screen inlet opening 60 (see FIG. 1A), via the seal plate 58, is an important feature of the invention. FIG. 4 shows a contact seal 74 secured to the rotating drum screen around a full circumference, deflected essentially 90° via pressure against the seal plate, to maintain a water seal. This is better seen in the enlarged detail of FIG. 5. The full-circumference seal 74, which can be of an elastomeric material such as Neoprene, is retained to the drum screen by fasteners such as bolts 76 passing through a plate 78 that extends around the circumference of the drum. The seal 74, which may be planar in its undeflected state, has a deflected arm 80 that bears against and slides along the seal plate 58 as shown. Since the seal 74 is allowed to partially return toward the undeflected state as it moves above the seal plate 58, the seal plate can have, as seen in FIG. 1A, an angled guide 82 fixed to the seal plate to transition the seal back into its deflected position as it descends to again engage in a deflected configuration the seal plate. Note that in FIG. 5 the sectioned portion of the seal plate 58 is at the bottom center of the drum, whereas above that sectioned region is the opening for flow into the drum. And thus, the edge of the seal plate 58 defining the opening is seen above the sectioned region.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A rotating drum screen installation for screening out debris from a flow of water in a channel, comprising:
    a drum rotating on a horizontal axis, with a shaft supporting the drum for rotation, the shaft being supported on fixed structure of the channel, and a screen extending around the drum's circumference, forming the drum screen,
    the axis of the drum screen being perpendicular to the channel flow direction such that the drum has a width that occupies part of a width of the channel, leaving a remaining width of the channel for water flow, the drum screen having a diameter not greater than about 10 feet, and being a single entry drum screen, with an open side facing said remaining width of the channel and positioned to receive a flow of water from said remaining width of the channel,
    the channel having a flow direction from upstream to downstream, and said remaining width of the channel being blocked by a barrier adjacent to a downstream end of the drum screen,
    a seal plate positioned in the channel alongside the open side of the drum screen, with a flexible contact seal between the seal plate and a circular side edge of the rotatable drum screen,
    the seal plate having a water admitting opening to permit said flow of water into the drum screen from the open side,
    a diverter plate in the channel, with a downstream end of the diverter plate connected to an upstream end of the seal plate, the diverter plate having an upstream end fixed to a wall of the channel and engaged against a floor of the channel, a main portion of the diverter plate being angled so as to form a parallel flow offset to direct all water and debris flowing in the channel into said remaining width of the channel prior to entering the drum screen through said water admitting opening, and
    the drum screen installation including a debris hopper within the drum, fixed in position near a highest point of the drum, for catching debris from the screen as the drum screen rotates, and with a series of high-pressure water nozzles above the drum aimed at the hopper, to dislodge the debris from the screen into the hopper, and further including an exit trough positioned to carry away the debris and water from the hopper.

2. The rotatable drum screen installation of claim 1, wherein the diverter plate and the seal plate are formed as a single unit.

3. The rotatable drum screen installation of claim 2, wherein the diverter plate and seal plate are integrally formed from a single piece.

4. The rotatable drum screen installation of claim 2, wherein the diverter plate and seal plate are secured together at said upstream end of the seal plate.

5. The rotatable drum screen installation of claim 1, wherein the water admitting opening has a shape following the shape of a lower half of the drum screen, approximately an open half-circle.

6. The rotatable drum screen installation of claim 1, wherein the high-pressure nozzles spray water at a minimum pressure of 45 psi.

7. The rotatable drum screen installation of claim 1, wherein the drum screen has a width approximately half the width of the channel.

8. The rotatable drum screen installation of claim 7, wherein the drum screen has a width of 45% to 55% the width of the channel.

9. The rotatable drum screen installation of claim 1, wherein the contact seal is secured to said circular side edge of the drum screen.

10. The rotatable drum screen installation of claim 9, wherein the contact seal is of elastomeric material and is deflected to a bending configuration by engagement against the seal plate, to exert a sealing force against the seal plate.

11. In a rotatable drum screen installation for screening out debris from a flow of water in a channel, including a drum rotatable on a horizontal axis, with a shaft supporting the drum for rotation, the shaft being supported on fixed structure of the channel, and a screen extending around the drum's circumference, forming the drum screen, the improvement comprising:
    the axis of the drum screen being perpendicular to the channel flow direction such that the drum has a width that occupies part of a width of the channel, leaving a remaining width of the channel for water flow, the drum screen being a single entry drum screen with an open side facing said remaining width of the channel and positioned to receive a flow of water entering from said remaining width of the channel,
    the channel having a flow direction from upstream to downstream, and said remaining width of the channel being blocked by a barrier near a downstream end of the drum screen,
    a combination seal plate and diverter plate, the seal plate positioned in the channel alongside the open side of the drum screen, with a flexible contact seal between the seal plate and a circular side edge of the rotatable drum screen, and the seal plate having a water admitting opening to permit said flow of water into the drum screen from the open side, and the diverter plate having a downstream end connected to an upstream end of the seal plate, the diverter plate having an upstream end fixed to a wall of the channel and engaged against a floor of the channel, a main portion of the diverter plate being angled so as to form a parallel flow offset to direct all water and debris flowing in the channel into said remaining width of the channel prior to entering the drum screen through said water admitting opening, and the drum screen installation including a debris hopper and means for collecting screened debris in the hopper and removing the debris from the drum screen installation.

12. The rotatable drum screen installation of claim 11, wherein the diverter plate and seal plate are integrally formed from a single piece.

13. The rotatable drum screen installation of claim 11, wherein the diverter plate and the seal plate are secured together at said upstream end of the seal plate.

14. The rotatable drum screen installation of claim 11, wherein the drum screen has a width approximately half the width of the channel.

15. The rotatable drum screen installation of claim 14, wherein the drum screen has a width of 45% to 55% the width of the channel.

16. The rotatable drum screen installation of claim 11, wherein the contact seal is secured to said circular side edge of the drum screen.

* * * * *